(12) United States Patent
Sethi et al.

(10) Patent No.: US 11,829,482 B2
(45) Date of Patent: Nov. 28, 2023

(54) PRE-BOOT AUTHENTICATION FOR VIRTUAL MACHINES USING CREDENTIALS STORED IN VIRTUAL TRUSTED PLATFORM MODULES

(71) Applicant: Dell Products L.P., Round Rock, TX (US)

(72) Inventors: Parminder Singh Sethi, Ludhiana (IN); Suren Kumar, Kavanur (IN)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 17/381,337

(22) Filed: Jul. 21, 2021

(65) Prior Publication Data
US 2022/0391512 A1     Dec. 8, 2022

(30) Foreign Application Priority Data
Jun. 8, 2021   (IN) ............................. 202141025414

(51) Int. Cl.
| | |
|---|---|
| *G06F 21/57* | (2013.01) |
| *G06F 21/54* | (2013.01) |
| *G06F 21/60* | (2013.01) |
| *G06F 9/455* | (2018.01) |

(Continued)

(52) U.S. Cl.
CPC ........ *G06F 21/575* (2013.01); *G06F 9/45545* (2013.01); *G06F 9/45558* (2013.01); *G06F 21/31* (2013.01); *G06F 21/54* (2013.01); *G06F 21/602* (2013.01); *G06F 21/107* (2023.08); *G06F 2009/45587* (2013.01)

(58) Field of Classification Search
CPC ............... G06F 21/575; G06F 9/45545; G06F 9/45558; G06F 21/31; G06F 21/54; G06F 21/602; G06F 2009/45587; G06F 2221/0751; G06F 2221/2149; G06F 21/53; G06F 21/72
See application file for complete search history.

(56) References Cited

U.S. PATENT DOCUMENTS 10,073,966 B2 *  9/2018  Oberg ..................... G06F 21/51
11,537,421 B1 * 12/2022  Brooker ................ H04L 9/0894
(Continued)

OTHER PUBLICATIONS

Dell EMC, "Dell Encryption Personal," Installation Guide v11.0, May 2021, Rev. A01, 88 pages.
(Continued)

*Primary Examiner* — Bruce S Ashley
(74) *Attorney, Agent, or Firm* — Ryan, Mason & Lewis, LLP

(57) ABSTRACT

An apparatus comprises a processing device configured to receive, at a host operating system of a virtual machine host, a request to execute a virtual machine and to obtain, from a virtual trusted platform module running on the virtual machine host, credentials for logging in to a guest operating system of the virtual machine. The processing device is further configured to provide, to pre-boot authentication software associated with the virtual machine, the credentials obtained from the virtual trusted platform module, and to automatically log in to the guest operating system of the virtual machine utilizing the pre-boot authentication software and the provided credentials.

20 Claims, 7 Drawing Sheets

(51) Int. Cl.
*G06F 21/31* (2013.01)
*G06F 21/10* (2013.01)

(56) References Cited

U.S. PATENT DOCUMENTS

| | | | |
|---|---|---|---|
| 2004/0039924 A1* | 2/2004 | Baldwin | H04L 9/0891 |
| | | | 713/189 |
| 2009/0328195 A1* | 12/2009 | Smith | G06F 21/575 |
| | | | 726/16 |
| 2012/0266252 A1* | 10/2012 | Spiers | H04L 63/08 |
| | | | 726/26 |
| 2014/0075522 A1* | 3/2014 | Paris | G06F 21/575 |
| | | | 726/5 |
| 2015/0319160 A1* | 11/2015 | Ferguson | H04W 12/10 |
| | | | 726/10 |
| 2019/0356650 A1* | 11/2019 | Leavy | H04L 63/06 |
| 2021/0406051 A1* | 12/2021 | Tsirkin | G06F 21/602 |

OTHER PUBLICATIONS

VMware, "vSphere Security," Update 2, VMware vSphere 7.0, VMware ESXi 7.0, vCenter Server 7.0, May 13, 2021, 406 pages.
Dell, "Third party Nested Virtualization in Windows Server 2019," https://www.dell.com/support/kbdoc/en-us/000132088/third-party-nested-virtualization-in-windows-server-2019#:~:text=What%20is%20nested%20virtualization%3F,another%20virtual%20machine%20within%20itself.&text=As%20an%20advancement%20for%20the,introduced%20in%20Windows%20Server%202019, Feb. 21, 2021, 2 pages.

* cited by examiner

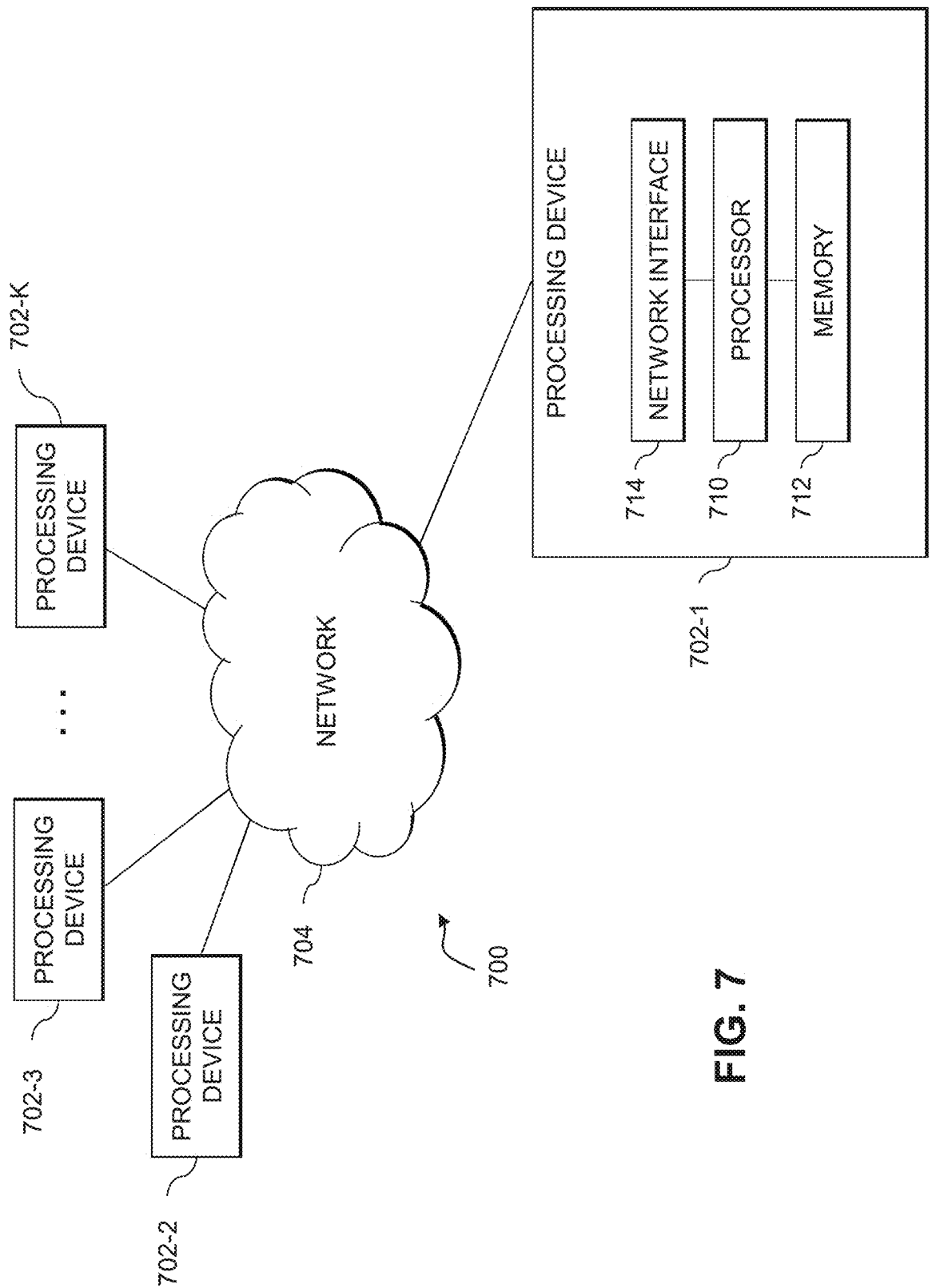

PRE-BOOT AUTHENTICATION FOR VIRTUAL MACHINES USING CREDENTIALS STORED IN VIRTUAL TRUSTED PLATFORM MODULES

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure.

SUMMARY

Illustrative embodiments of the present invention provide techniques for pre-boot authentication for virtual machines using credentials stored in virtual trusted platform modules.

In one embodiment, an apparatus comprises at least one processing device comprising a processor coupled to a memory. The at least one processing device is configured to perform the steps of receiving, at a host operating system of a virtual machine host, a request to execute a virtual machine and obtaining, from a virtual trusted platform module running on the virtual machine host, credentials for logging in to a guest operating system of the virtual machine. The at least one processing device is further configured to perform the steps of providing, to pre-boot authentication software associated with the virtual machine, the credentials obtained from the virtual trusted platform module, and automatically logging in to the guest operating system of the virtual machine utilizing the pre-boot authentication software and the provided credentials.

These and other illustrative embodiments include, without limitation, methods, apparatus, networks, systems and processor-readable storage media.

BRIEF DESCRIPTION OF THE DRAWINGS

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
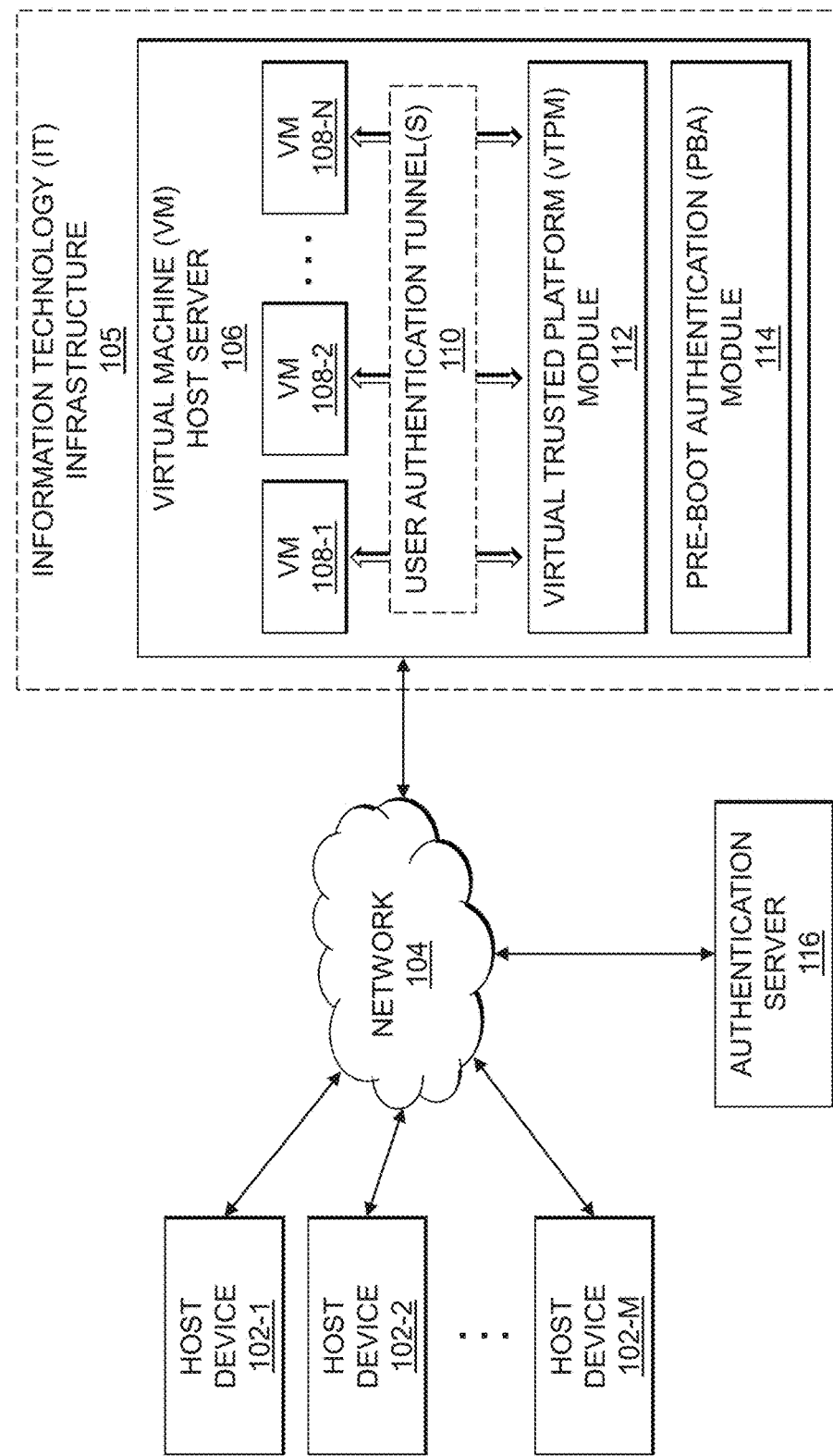
FIG. 1 is a block diagram of an information processing system configured for pre-boot authentication for virtual machines using credentials stored in virtual trusted platform modules in an illustrative embodiment of the invention.

FIG. 1 shows an information processing system 100 configured in accordance with an illustrative embodiment. The information processing system 100 is assumed to be built on at least one processing platform and provides functionality for pre-boot authentication for virtual machines (VMs). The information processing system 100 includes a set of host devices 102-1, 102-2, . . . 102-M (collectively, host devices 102) that are coupled via a network 104 to a VM host server 106 that runs in information technology (IT) infrastructure 105.

The host devices 102 and VM host server 106 may comprise respective compute resources, which may include physical and virtual computing resources (e.g., of the IT infrastructure 105). Physical computing resources may include physical hardware such as servers, storage systems, networking equipment, Internet of Things (IoT) devices, other types of processing and computing devices, etc. Virtual computing resources may include virtual machines (VMs), software containers, etc. As will be described in further detail below, the VM host server 106 may itself be a VM in a nested virtualization environment.

In some embodiments, the host devices 102 and the VM host server 106 are assumed to comprise physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." As noted above, the host devices 102 and VM host server 106 may also or alternately comprise virtualized computing resources, such as VMs, software containers, etc.

The host devices 102 and VM host server 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The VM host server 106 is assumed to run a set of VMs 108-1, 108-2, . . . 108-N (collectively VMs 108). The VMs 108 are assumed to have respective user authentication tunnels (UATs) 110 established with a software trusted platform module (TPM), also referred to as a virtual trusted platform module (vTPM), 112. The VM host server 106 also includes a pre-boot authentication (PBA) module 114. The UATs 110 provide a secure channel for communication of credentials between the VMs 108 and the vTPM 112. In some embodiments, the first time that a given end-user requests to boot, launch, open or otherwise execute a given one of the VMs 108 (e.g., VM 108-1), the given end-user supplies the necessary user credentials for logging in to a guest operating system (OS) of the given VM 108-1. The given end-user may comprise an end-user of one of the host devices 102 (e.g., host device 102-1) that sends a request to open or execute the given VM 108-1 via network 104 to the VM host server 106. The given end-user may alternatively comprise an end-user of the VM host server 106 itself. The OS of the given VM 108-1 is a "guest" OS relative to a "host" OS of the VM host server 106 on which the given VM 108-1 runs. On successful login (or other successful authentication or authorization of the given end-user in the given VM 108-1), the necessary user credentials are stored in the vTPM 112. On receiving a second or subsequent request from the given end-user to boot, launch, open or otherwise execute the given VM 108-1, the given VM 108-1 uses its UAT 110 to communicate with the vTPM 112 in order to obtain the user credentials necessary for logging in to the guest OS of the given VM 108-1. Such user credentials may be provided to the PBA module 114 to provide a seamless authentication or authorization of the given end-user.

In some embodiments, the given VM 108-1 may use local authentication methods, such as Active Directory (AD), Lightweight Directory Access Protocol (LDAP), etc. In other embodiments, the given VM 108-1 may use single sign-on (SSO) authentication methods. For SSO authentication methods, the user credentials for the given VM 108-1 (e.g., a guest OS thereof) may be obtained from an authentication server 116 that is external to the VM host server 106. The initial access request for the given VM 108-1 may be redirected to the authentication server 116, which validates the supplied user credentials and then returns a token to the given VM 108-1. In such embodiments, the returned token may be used for generating a private key (e.g., using the PBA module 114) for logging in to the guest OS of the given VM 108-1. That private key, the returned token, or some combination of the private key and the returned token may be stored in the vTPM 112 and used for subsequent login attempts.

It should be noted that although various embodiments are described with respect to performing pre-boot authentication of VMs (e.g., VMs 108) using credentials stored in vTPMs (e.g., vTPM 112), the techniques described herein may also be applied for pre-boot authentication of containers using credentials stored in vTPMs. Such containers may themselves run VMs (e.g., the VMs 108), or may run outside of any VM.

Although not explicitly shown in FIG. 1, one or more input-output devices such as keyboards, displays or other types of input-output devices may be used to support one or more user interfaces to the host devices 102, the VM host server 106, the VMs 108, the authentication server 116, or components thereof, as well as to support communication between the host devices 102, the VM host server 106, the VMs 108, the authentication server 116 and other related systems and devices not explicitly shown.

The host devices 102 are assumed to be utilized by various different users. The term "user" herein is intended to be broadly construed so as to encompass numerous arrangements of human, hardware, software or firmware entities, as well as combinations of such entities.

The host devices 102, the VM host server 106, and the authentication server 116 in the FIG. 1 embodiment are assumed to be implemented using at least one processing device. Each such processing device generally comprises at least one processor and an associated memory, and implements one or more functional modules for controlling certain features of the host devices 102, the VM host server 106 (e.g., VMs 108, UATs 110, vTPM 112, PBA module 114), and the authentication server 116.

At least portions of the UATs 110, the vTPM 112, the PBA module 114 and other components of the information processing system 100 may be implemented at least in part in the form of software that is stored in memory and executed by processors of such processing devices.

It is to be appreciated that the particular arrangement of the host devices 102, the VM host server 106, the IT infrastructure 105 and the authentication server 116 illustrated in the FIG. 1 embodiment is presented by way of example only, and alternative arrangements can be used in other embodiments. For example, in some embodiments the authentication server 116 is not required (e.g., where local user authentication methods rather than SSO authentication methods are used). As another example, as will be described in further detail below, in some embodiments the VMs 108 are part of a nested virtualization environment (e.g., where one or more of the VMs run on hypervisors implemented by other ones of the VMs 108).

It is to be understood that the particular set of elements shown in FIG. 1 for pre-boot authentication for VMs using credentials stored in vTPMs is presented by way of illustrative example only, and in other embodiments additional or alternative elements may be used. Thus, another embodiment may include additional or alternative systems, devices and other network entities, as well as different arrangements of modules and other components.

One or more of the host devices 102, the VM host server 106 and the authentication server 116, in some embodiments, may be part of cloud infrastructure as will be described in further detail below.

The host devices 102, the VM host server 106, the authentication server 116 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The host devices 102, the VM host server 106, and the authentication server 116, or components thereof, may be implemented on respective distinct processing platforms, although numerous other arrangements are possible. For example, in some embodiments at least portions of the host devices 102, the VM host server 106 and the authentication server 116 are implemented on the same processing platform. A given host device (e.g., 102-1) can therefore be implemented at least in part within at least one processing platform that implements at least a portion of the VM host server 106 and/or the authentication server 116.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, the VM host server 106 and the authentication server 116, or portions or components thereof, to reside in different data centers. Numerous other distributed implementations are possible. The host devices 102, the VM host server 106 and the authentication server 116 can also be implemented in a distributed manner across multiple data centers.

Additional examples of processing platforms utilized to implement portions of the information processing system 100 of FIG. 1 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
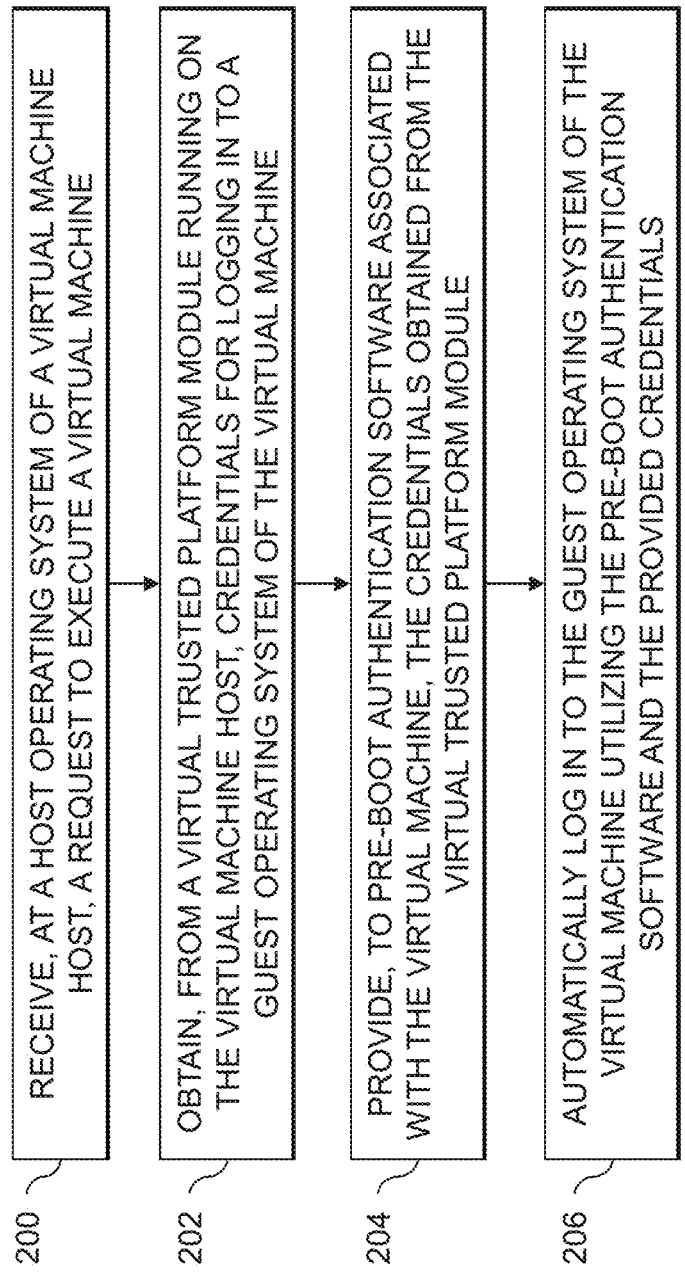
FIG. 2 is a flow diagram of an exemplary process for pre-boot authentication for virtual machines using credentials stored in virtual trusted platform modules in an illustrative embodiment.

An exemplary process for pre-boot authentication for VMs using credentials stored in vTPMs will now be described in more detail with reference to the flow diagram of FIG. 2. It is to be understood that this particular process is only an example, and that additional or alternative processes for pre-boot authentication for VMs using credentials stored in vTPMs can be carried out in other embodiments.

In this embodiment, the process includes steps 200 through 206. These steps are assumed to be performed at least in part by the VM host server 106 utilizing the VMs 108, UATs 110, vTPM 112 and the PBA module 114. The FIG. 2 process begins with step 200, receiving, at a host OS of a VM host (e.g., VM host server 106), a request to execute a virtual machine (e.g., one of VMs 108, such as VM 108-1). The VM host (e.g., the VM host server 106) may comprise a bare metal hypervisor that runs directly on hardware of a host device, a hosted hypervisor (e.g., that runs within the host OS of the VM host), a hypervisor that runs within another VM, etc. In some embodiments, the VM comprises a nested VM that executes inside of a virtualized computing environment on the VM host. For example, the nested VM may be installed on a root VM of the virtualized computing environment.

In step 202, credentials for logging in to a guest OS of the VM are obtained from a vTPM (e.g., vTPM 112) running on the VM host. The credentials may comprise access credentials for a given user in a given domain, and the access credentials for the given user in the given domain may be the same for the host OS of the VM host and the guest OS of the VM. The credentials may comprise SSO credentials provided via an authentication server (e.g., authentication server 116) external to the VM host. The credentials may comprise a token generated by the authentication server external to the VM host. The token may be stored in encrypted form in the vTPM utilizing a secret key of the vTPM. The credentials may alternatively comprise local user authentication credentials, such as AD or LDAP authentication credentials.

The credentials obtained from the vTPM are provided to PBA software (e.g., PBA module 114) associated with the VM in step 204. In some embodiments, the credentials comprise a private key generated by the PBA software during a previous boot of the VM, and the private key may be stored in encrypted form in the vTPM utilizing a secret key of the vTPM. Step 204 may include creating a UAT (e.g., UAT 110) between the vTPM and the VM, and passing the credentials over the UAT between the vTPM and the VM. The FIG. 2 process continues with step 206, automatically logging in to the guest OS of the VM utilizing the PBA software and the provided credentials.

Physical TPMs provide secure coprocessors (e.g., such as in the form of a dedicated microcontroller or other hardware) that can perform various functions including cryptographic operations. Software TPMs, also referred to as virtual TPMs, are configured to provide such functionality (e.g., cryptographic coprocessor capabilities) in software rather than in a dedicated microcontroller or other hardware. Software TPMs or vTPMs may be used for various tasks, including by way of example enabling a guest OS running in a VM to create and store keys that are private. These keys are not exposed to the guest OS itself. Therefore, the VM attack surface is reduced.

Figure 3:
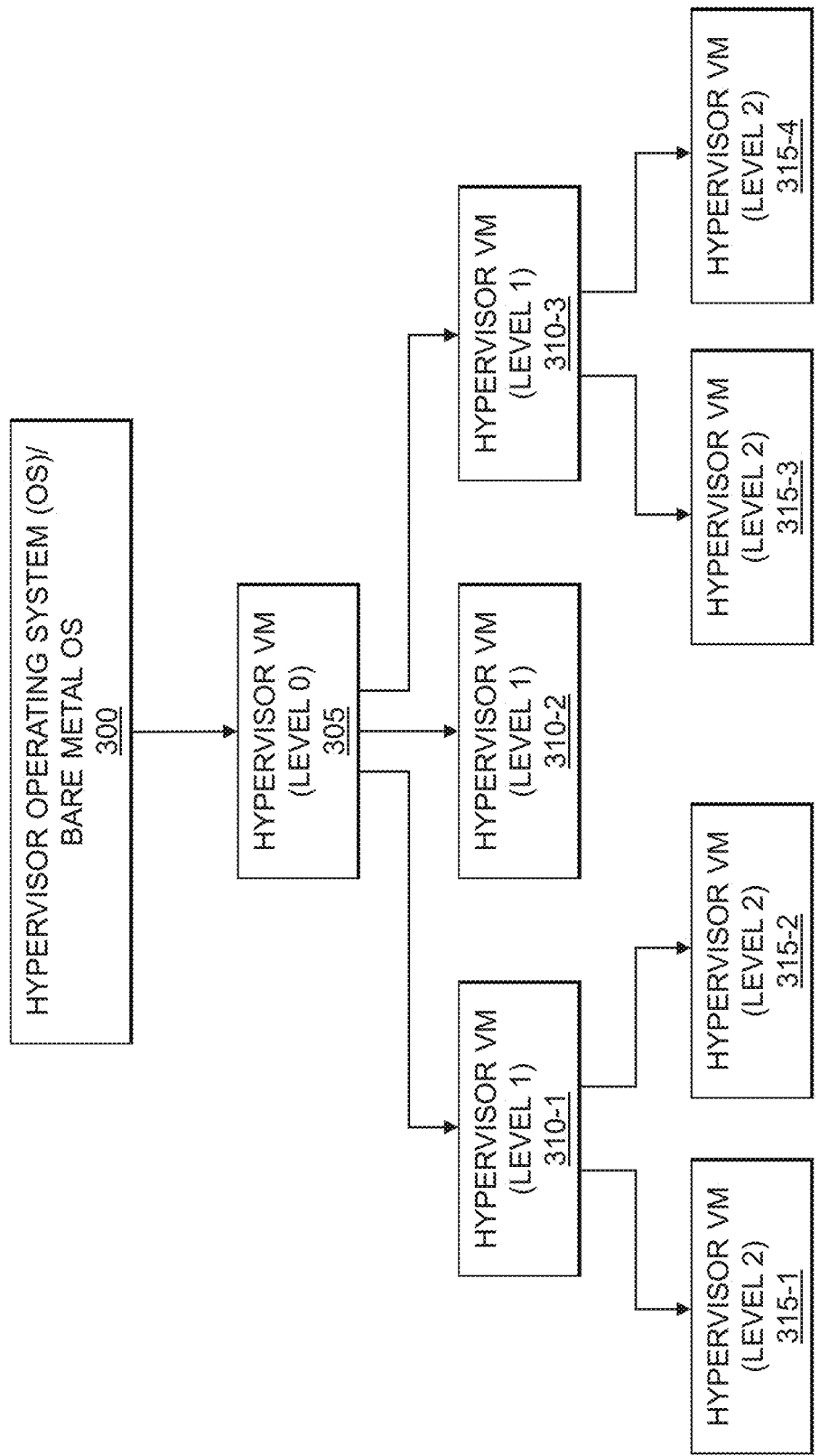
FIG. 3 shows a virtualization environment including nested virtual machines in an illustrative embodiment.

Nested virtualization allows VMs to run inside a virtualized environment. In other words, nested virtualization provides the ability to run a hypervisor inside a VM, which itself runs on a hypervisor, and so on. FIG. 3 shows an example of a nested virtualization architecture including multiple levels. The top-most level includes a hypervisor OS (e.g., a hosted hypervisor) or bare metal OS 300. In the next level (e.g., Level 0) at least one hypervisor VM 305 runs. The hypervisor VM 305 is also referred to as a Level 0 hypervisor VM 305. The hypervisor VM 305 is assumed to itself run a hypervisor, on which another level (e.g., Level 1) hypervisor VMs 310-1, 310-2 and 310-3 (collectively, Level 1 hypervisor VMs 310) run. Some of the Level 1 hypervisor VMs 310 may themselves also run hypervisors. In the FIG. 3 example, hypervisor VM 310-1 and hypervisor VM 310-3 in Level 1 each run a hypervisor on which additional hypervisor VMs in another level (e.g., Level 2) run. The Level 2 hypervisor VMs include hypervisor VMs 315-1 and 315-2 running on hypervisor VM 310-1, as well as hypervisor VMs 315-3 and 315-4 running on hypervisor VM 310-3. The hypervisor VMs 315-1, 315-2, 315-3 and 315-4 are collectively referred to as Level 2 hypervisor VMs 315. Although FIG. 3 shows an example architecture with just three levels of nested VMs, in other embodiments there may be more or fewer levels of nested VMs as well as different numbers of VMs in each of the levels. The nested VMs may be labelled by level (e.g., 0, 1, 2, etc.) based on their respective installation locations. Nested VMs may be used for various purposes, including but not limited to deployment and testing of virtual clouds, virtualization training, providing guest virtualization to end-users, etc.

Figure 4:
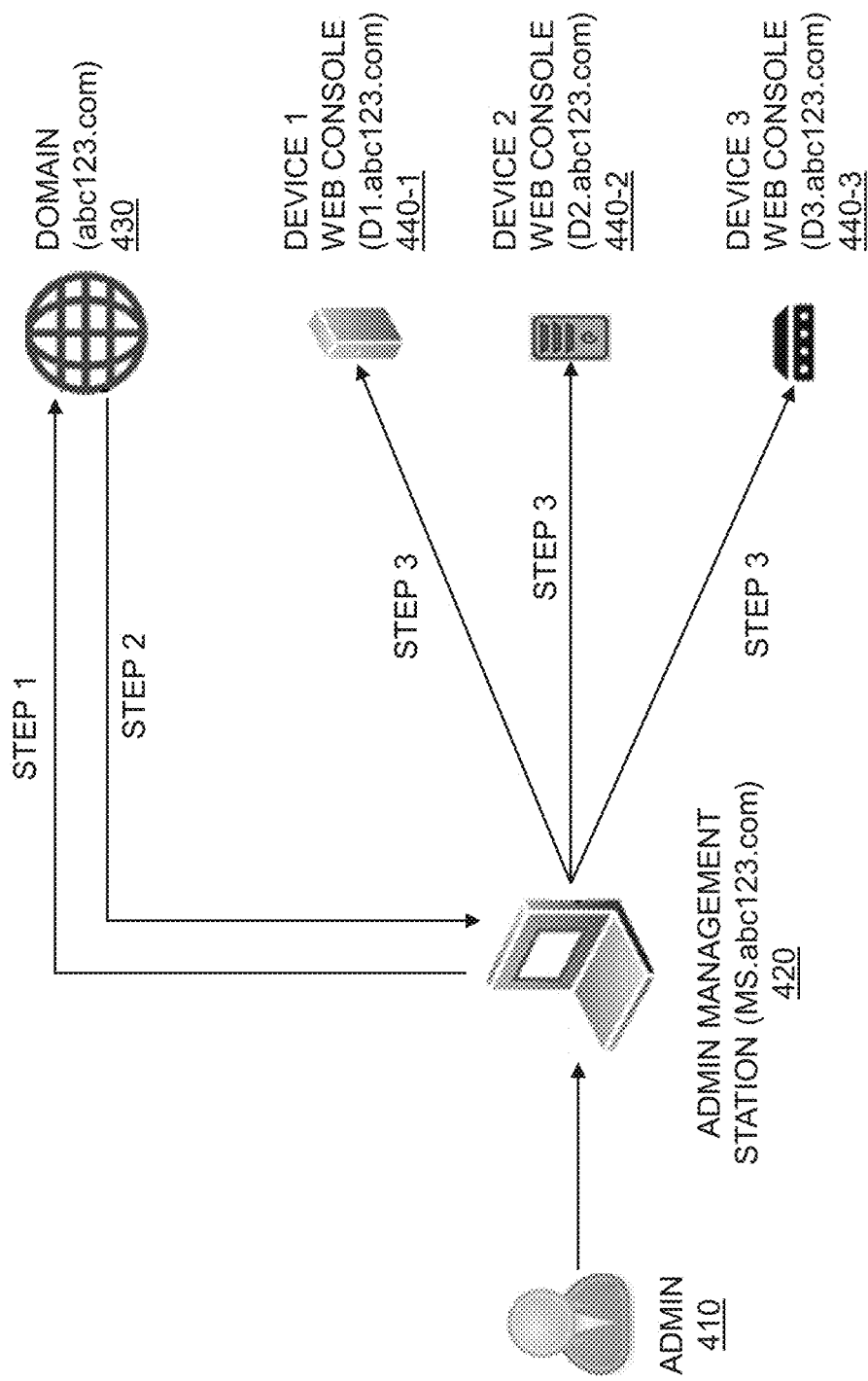
FIG. 4 shows a system flow for single sign-on authentication to multiple devices in an illustrative embodiment.

Many applications and OSes rely on password-less user authentication methods for quick and seamless access. SSO authentication, for example, may be used for secure password-less authentication. SSO provides centralized and secure user authentication for applications, websites, etc., that an end-user is trying to access using the SSO domain or without domain login credentials. SSO is a property of identity and access management (IAM) that enables users to authenticate with multiple entities (e.g., applications and other software, websites, etc.) by logging in only once. FIG. 4 shows an example SSO process, where an admin 410 logs in to an admin management station 420 (e.g., a laptop, desktop, etc.) by manually typing in domain user credentials for a domain (e.g., abc123.com). In step 1, the domain user credentials are provided to the domain 430 (e.g., an authentication server thereof), which validates the credentials and returns a token to the admin management station 420 in step 2. The token is then used by the admin management station 420 in step 3 to log in to multiple web management consoles that are configured with SSO authentication for the same domain (e.g., abc123.com), including device web consoles 440-1, 440-2 and 440-3 (collectively, device web consoles 440). FIG. 4 illustrates one-to-one authentication, or single layer SSO authentication.

In a virtualized environment, end-users (e.g., such as IT staff) need to provide local/domain user credentials to access any of the VMs in the virtualized environment. Pre-boot authentication solutions for VM password authentication are susceptible to "man-in-the-middle" and "pass-the-hash" attacks. Consider a virtualization environment where a group of VMs are installed and configured with the same domain (e.g., abc123.com) for user authentication. In a first use case, with individual or standalone VMs, an admin or other user logs into the host OS using the domain credentials and accesses the individual or standalone VMs which are installed in the host OS. In a second use case, with nested VMs, an admin or other user logs in to one or more root VMs (e.g., at a first level) using the domain credentials, and then accesses nested VMs (e.g., at a lower level) which are installed in the one or more root VMs. In both of these use case scenarios, the admin or other user needs to provide the domain credentials again and again (e.g., once for every VM that the admin or other user logs in to) even though the admin or other user is an authorized user since all of the VMs are assumed to be part of the same domain. This is time-consuming and can be frustrating for end-users, particularly as the number of VMs that an end-user logs in to increases, when an end-user must repeatedly close and launch VMs, etc.

There is thus a need for an intelligent approach that provides seamless access to authenticate VMs securely based on a host OS or root VM user access credentials. Illustrative embodiments provide such solutions helpful in various use case scenarios including but not limited to virtualization environments with nested VMs, multiple standalone VMs, clusters of VMs, etc. The solution used in some embodiments will securely store the domain user authentication credentials in a software TPM or vTPM, and pass the domain user authentication credentials to a VM's OS during boot to authenticate the user and access the VMs seamlessly (e.g., utilizing PBA software associated with the VMs). Advantageously, this solution will work for multiple platforms, including but not limited to Microsoft® Windows and VMWare® platforms by enabling vTPM features on guest VMs. Illustrative embodiments will be described below in the context of an SSO-configured virtualized environment, as this is one exemplary use case for seamless user authentication. It should be noted, however, that the techniques described herein can be implemented for other types of user authentication including but not limited to local or domain (e.g., AD, LDAP, etc.) user authentication methods.

In some embodiments, a solution makes available a new user authentication option for "SSO for VM" which can be configured during VM creation, or for existing production VMs. Once this option is enabled, this will create a UAT channel between the host and the VMs. By using the created UAT channel, the host or root VM's user credentials will be securely stored in the vTPM of the VM. Since the solutions described herein make use of an internal OS passthrough channel, this will be secured. In some embodiments, there is a requirement that the user and domain credentials are identical for both the node or host and the VM. For example, an admin or other end-user logged in to the hypervisor OS using some domain credentials (e.g., sampleuser@testdomain.net) may also try to access individual VMs or nested VMs using the same domain credentials.

For security reasons, the first time that an admin or other end-user logs in to a particular VM, the admin or other end-user will need to enter the domain credentials to ensure proper authorization. After the first successful authentication to each VM, the SSO login credentials will get stored in the vTPM. The next time that the admin or other end-user tries to access the VM (e.g., with "SSO for VM" enabled) from the same domain (e.g., sampleuser@testdomain.net), the VM will get accessed seamlessly. If the admin or other end-user is logged in to the hypervisor OS using a different username or domain, the VM will not be logged in to automatically since the request is coming from a different entity.

Figure 5:
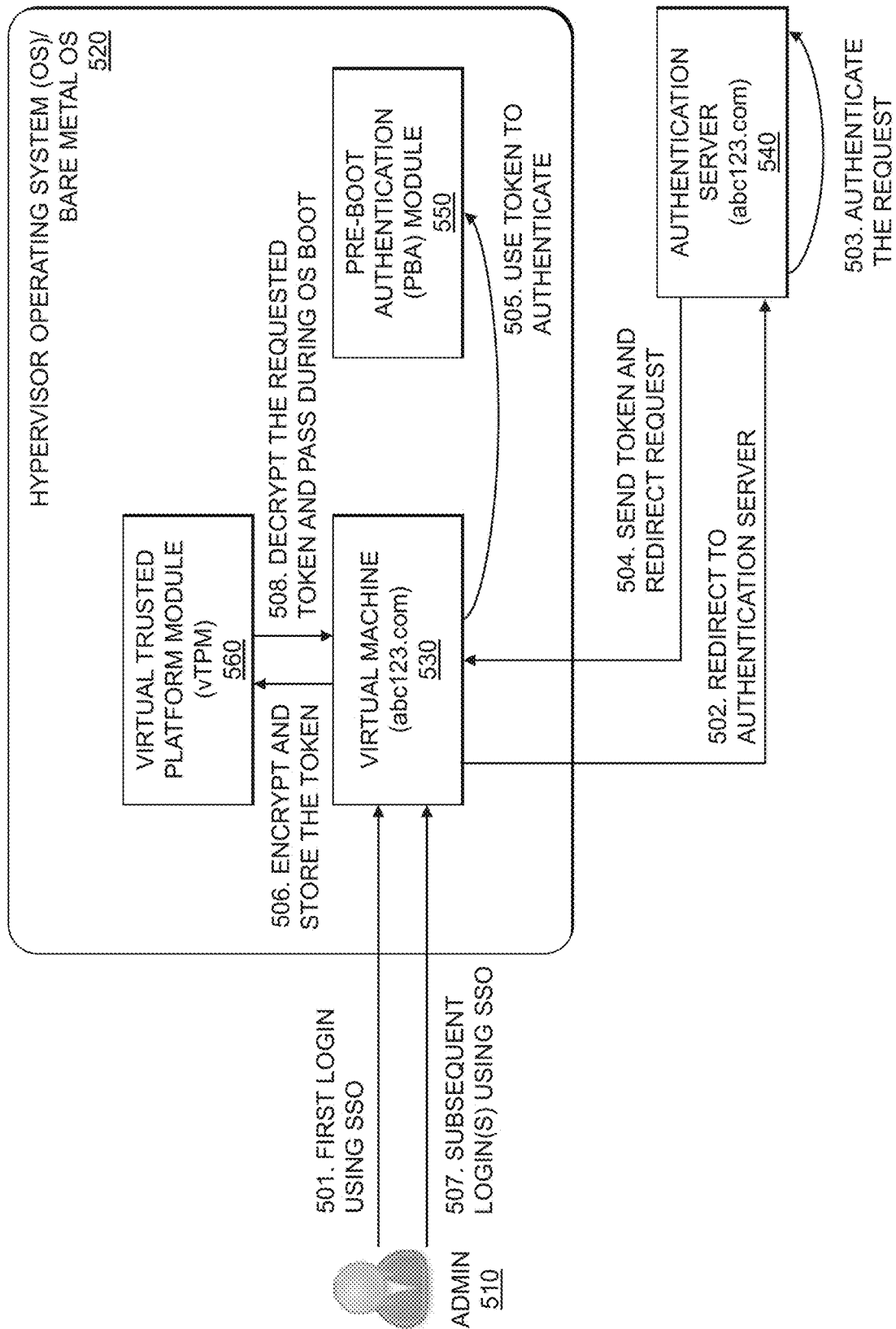
FIG. 5 shows a system flow for pre-boot authentication of virtual machines utilizing credentials stored in a virtual trusted platform module in an illustrative embodiment.

FIG. 5 shows an example system flow using the techniques described herein. The FIG. 5 system flow begins with an admin or other end-user 510 in step 501 logging in to a VM 530 running on a hypervisor OS or bare metal OS 520 using domain SSO user credentials (e.g., for the domain abc123.com) for the first time. In step 502, the SSO user authentication request will be redirected from the VM 530 to the specific domain authentication server 540 (e.g., for the domain abc123.com). The authentication server 540 in step 503 authenticates the request by validating input (e.g., credentials) provided by the admin 510. After validating the provided input, the authentication server 540 in step 504 sends a domain token and redirects the SSO user authentication request back to the host VM 530.

In step 505, the VM 530 uses PBA module 550 associated with the VM 530 to authenticate the admin 510 to the VM 530. The PBA module 550 will receive the token (generated by the authentication server 540 and sent to the VM 530 in step 504), generate a private key based upon the request received from the domain authentication server 540, and authenticate the host system (e.g., VM 530). In step 506, the generated private key from the PBA module 550 and/or the token received from the authentication server 540 will be encrypted and stored in vTPM 560. On second and subsequent logins by the admin 510 to the VM using "SSO for VM" features in step 507, the VM 530 will obtain the encrypted private key and/or token from the vTPM 560. The VM 530 in step 508 decrypts the encrypted private key and/or token to obtain the private key which will be given to the PBA module 550 associated with the VM 530 to authenticate the admin 510 without any intervention or input from the admin 510. From the admin or other end-user 510 perspective, the second and subsequent logins to the VM 530 (e.g., from the same user/domain) are seamless in that the admin or other end-user 510 can simply boot or open the VM 530.

As illustrated in the FIG. 5 system flow, when the admin 510 logs in to the VM 530 using domain SSO authentication (e.g., for the first time), the PBA module 550 will generate a private key based upon a response (e.g., a token) received from the domain authentication server 540. Using the private key, the OS login authentication for the VM 530 will happen. In illustrative embodiments, the VM 530 will retrieve the private key from the PBA module 550 and pair it with a key of the vTPM 560. This paired key will be encrypted to hide the user credential details, and is stored in the vTPM 560. On second and subsequent login attempts from the admin 510, the encrypted key is retrieved from the vTPM 560 and the private key will be given to the PBA module 550 of the hypervisor OS or bare metal OS 520 to authenticate the admin 510 without requiring any intervention or input from the admin 510.

Advantageously, illustrative embodiments provide methods for secured seamless SSO authentication for individual as well as nested VMs by storing an SSO token in a vTPM and managing end-to-end (E2E) VM OS authentication. In some embodiments, a new UAT is created between the host (e.g., a hypervisor OS or bare metal OS) and the VMs to securely transfer and store SSO domain credentials.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for pre-boot authentication for VMs using credentials stored in vTPMs will now be described in greater detail with reference to FIGS. 6 and 7. Although described in the context of system 100, these platforms may also be used to implement at least portions of other information processing systems in other embodiments.

Figure 6:
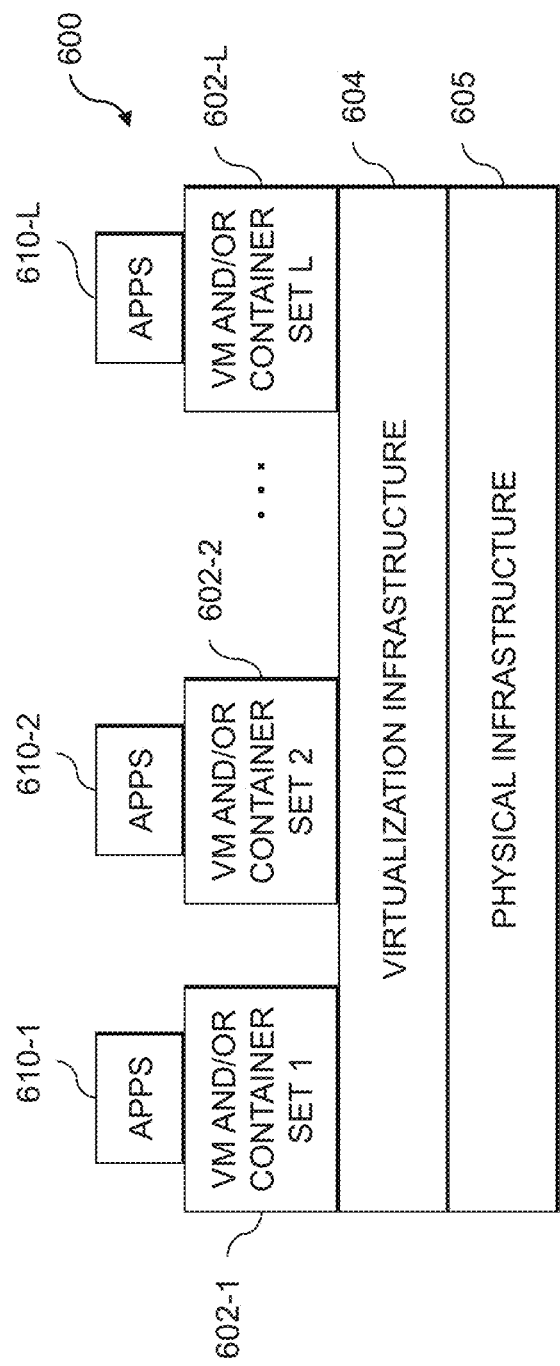

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for pre-boot authentication for VMs using credentials stored in vTPMs as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user authentication methods, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving, at a host operating system of a virtual machine host, a request to execute a virtual machine;
   obtaining, from a virtual trusted platform module running on the virtual machine host and external to the virtual machine, credentials for logging in to a guest operating system of the virtual machine;
   providing, to pre-boot authentication software associated with the virtual machine, the credentials obtained from the virtual trusted platform module; and
   automatically logging in to the guest operating system of the virtual machine utilizing the pre-boot authentication software and the provided credentials.

2. The apparatus of claim 1 wherein the virtual machine host comprises a bare metal hypervisor running on a host device.

3. The apparatus of claim 1 wherein the virtual machine host comprises a hypervisor running within the host operating system.

4. The apparatus of claim 1 wherein the virtual machine host comprises a hypervisor running within another virtual machine.

5. The apparatus of claim 1 wherein the virtual machine comprises a nested virtual machine that executes inside of a virtualized computing environment of the virtual machine host.

6. The apparatus of claim 5 wherein the nested virtual machine is installed on a root virtual machine of the virtualized computing environment.

7. The apparatus of claim 1 wherein the credentials comprise access credentials for a given user in a given domain, and wherein the access credentials for the given user in the given domain are the same for the host operating system of the virtual machine host and the guest operating system of the virtual machine.

8. The apparatus of claim 1 wherein the credentials comprise single sign-on credentials provided via an authentication server external to the virtual machine host.

9. The apparatus of claim 8 wherein the credentials comprise a token generated by the authentication server external to the virtual machine host.

10. The apparatus of claim 9 wherein the token is stored in encrypted form in the virtual trusted platform module utilizing a secret key of the virtual trusted platform module.

11. The apparatus of claim 1 wherein the credentials comprise local user authentication credentials.

12. The apparatus of claim 11 wherein the local user authentication credentials comprise lightweight directory access protocol authentication credentials.

13. The apparatus of claim 1 wherein the credentials comprise a private key generated by the pre-boot authentication software during a previous boot of the virtual machine, and wherein the private key is stored in encrypted form in the virtual trusted platform module utilizing a secret key of the virtual trusted platform module.

14. The apparatus of claim 1 wherein providing the credentials obtained from the virtual trusted platform module to the pre-boot authentication software running on the virtual machine comprises:
   creating a user authentication tunnel between the virtual trusted platform module and the virtual machine; and
   passing the credentials over the user authentication tunnel between the virtual trusted platform module and the virtual machine.

15. A computer program product comprising a non-transitory processor-readable storage medium having stored therein program code of one or more software programs, wherein the program code when executed by at least one processing device causes the at least one processing device to perform steps of:
   receiving, at a host operating system of a virtual machine host, a request to execute a virtual machine;
   obtaining, from a virtual trusted platform module running on the virtual machine host and external to the virtual machine, credentials for logging in to a guest operating system of the virtual machine;
   providing, to pre-boot authentication software associated with the virtual machine, the credentials obtained from the virtual trusted platform module; and
   automatically logging in to the guest operating system of the virtual machine utilizing the pre-boot authentication software and the provided credentials.

16. The computer program product of claim 15 wherein the credentials comprise a private key generated by the pre-boot authentication software during a previous boot of the virtual machine, and wherein the private key is stored in encrypted form in the virtual trusted platform module utilizing a secret key of the virtual trusted platform module.

17. The computer program product of claim 15 wherein providing the credentials obtained from the virtual trusted platform module to the pre-boot authentication software running on the virtual machine comprises:

creating a user authentication tunnel between the virtual trusted platform module and the virtual machine; and passing the credentials over the user authentication tunnel between the virtual trusted platform module and the virtual machine.

18. A method comprising:

receiving, at a host operating system of a virtual machine host, a request to execute a virtual machine;

obtaining, from a virtual trusted platform module running on the virtual machine host and external to the virtual machine, credentials for logging in to a guest operating system of the virtual machine;

providing, to pre-boot authentication software associated with the virtual machine, the credentials obtained from the virtual trusted platform module; and automatically logging in to the guest operating system of the virtual machine utilizing the pre-boot authentication software and the provided credentials;

wherein the method is performed by at least one processing device comprising a processor coupled to a memory.

19. The method of claim 18 wherein the credentials comprise a private key generated by the pre-boot authentication software during a previous boot of the virtual machine, and wherein the private key is stored in encrypted form in the virtual trusted platform module utilizing a secret key of the virtual trusted platform module.

20. The method of claim 18 wherein providing the credentials obtained from the virtual trusted platform module to the pre-boot authentication software running on the virtual machine comprises:

creating a user authentication tunnel between the virtual trusted platform module and the virtual machine; and passing the credentials over the user authentication tunnel between the virtual trusted platform module and the virtual machine.

\* \* \* \* \*